9875X
C. Granger,
Cook Stove.
Patented July 2. 1886
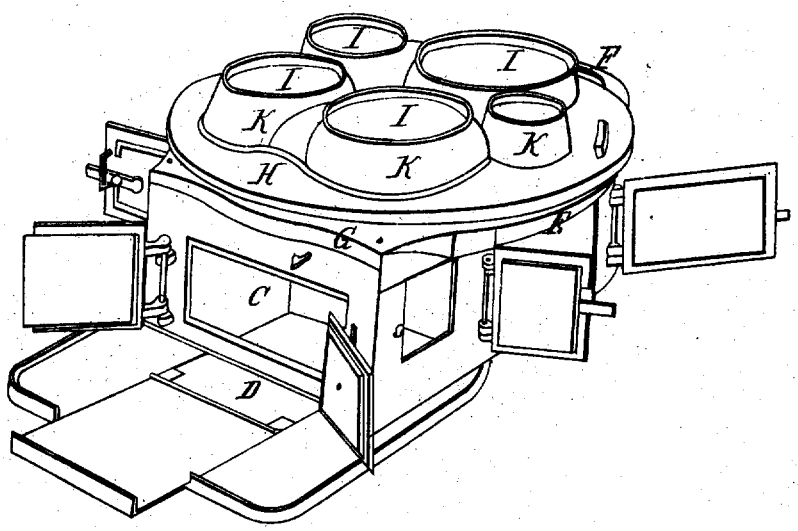
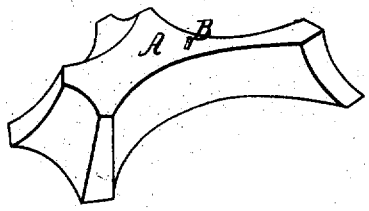

Chester Granger 520 9875X

The schedule referred to in these Letters Patent and making
part of the same containing a description in the words of
the said Chester Granger himself of his improvement in
the Cooking Stove.

To all to whom these presents shall come
Be it known that I Chester Granger of Pittsford in
the County of Rutland and State of Vermont have in-
vented a new and useful improvement in the Cooking
Stove and that the following is a full and exact descrip-
tion of the construction and operation of the said Cooking
Stove and the improvement thereof as invented and impro-
ved by me. The Cooking Stove for which the improve-
ment I claim is adapted is usually made with a fire cham-
ber consisting of four cast iron plates set upon a hearth or
bottom. The front part of the hearth or bottom may be sunk
for an ash pit. Back of the fire chamber and on a level
with it is an oven placed on the rear part of the before
mentioned bottom. Still back of this oven there is a rising
flue for the smoke to pass off, and the smoke and heat
pass both under and over the oven, into this rising flue,
There is a large circular plate placed over the fire room and
oven. This plate is stationary. In the front part of this
plate an open space is cut out nearly or quite as large
as the fire chamber, and placed directly over it. In the
rear part of this plate another open space is cut out, through
which the smoke passes into the rising flue. Into the centre
of this circular plate, is a socket designed for the centre pin of
the top plate hereafter described, on the outside of this circular
plate are placed four friction rollers, on which the top
plate, hereafter described, rests and revolves, This circular
plate is covered by another circular plate in diameter a
little larger than the lower circular plate, this upper
circular

9875X circular plate is called the cap or top of the Stove. This cap
is placed centrally, over the lower circular plate before described
On the lower circular plate is a groove on the outer edge and
on the upper circular plate or top is a flange or lip which fits
into the groove on the lower circular plate. The cap or top
is placed from one to two inches above the lower circular plate
That part of the cap which extends over the lower circular plate
rests and revolves upon the before mentioned friction rollers
The flange or lip of the top or cap is made of a width pro-
portioned to the distance of the upper and lower circular plates
apart and extends down just far enough to accurately
fit into the groove on the lower circular plate. The cap or
top is pierced with boiler holes in such number and size
as convenience and a due regard to the size of the stove
may require. These holes are designed for boilers or other
vessels or utensils used in cooking, and they are each
surrounded with a narrow edge or rim just sufficient
in width to keep the boiler or other utensils used steady
and firm in its place. The surface of this top plate on
the inside of these boiler holes is raised from two to six in-
ches above the surface of the same top plate on the out side
of the boiler holes. On the inside of these boiler holes the rim
is just sufficient in width as before mentioned to keep
the vessel which may be placed in or on such boiler hole
steady. On the outside of the boiler holes the rim slopes
down from two to six inches till it comes to the level
of the out side and lower part of the cap. Between the
boiler holes also the upper or raised surface of the top or
cap which is contained on the outside of the boiler holes
slopes down in a curve until it comes to a level with
the out side or lower part of the top plate. The edge or
rim around the boiler holes may be kept on as before des-
cribed or may be left entirely off, (so that the interior surface of the top plate between the boiler holes would be
exactly on a level with the boiler holes) as convenience may
dictate. The drawing of the top and stove which accompa-
nies this description is referred to as making a part of the same.
On the inside of this plate is placed a hollow cast iron box
of the form hereto annexed and marked A. This box
is fastened to the under side of the cap by a bolt and screw
or by rivets and cleats. On the lower side of this box is a
centre piece or pivot designed to fit into the socket
before mentioned in the lower circular plate. The sides
of this box are arched in such a manner as to fit the di-
mensions of the boiler which is designed to come next to them
and each side is curved so as to be exactly fitted to the
boiler intended to be inserted. This box may be made of
whatever weight is judged most expedient. The centre
piece or pivot above mentioned may be placed upon the
lower side of this box, or upon a lip leading from the lower side of this box. This last method is taken when
it is desired to extend either of the boilers past the centre
of the cap. The cap or top plate over this box and as be-
fore described on the space between the boiler holes, may
be exactly on the level with the boiler holes or the boi-
ler holes may be surrounded with a narrow edge or
rim, to keep the boilers griddles or other utensils used,
firm and steady in their places. On the outside of the
boiler holes the top plate slopes down something more
than the width of this box and between the boiler holes also the
top plate slopes down in a curve the same width as be-
fore described. The object of this centre box is to raise
the inner part of the top or cap within the boiler holes nearly
or quite to the level of the boiler holes thereby obviating the
great inconvenience and difficulty in cleaning that part
of the top plate when it is on a level with the part of the
top plate which is outside of the boiler holes. The object in-
tended

9875X tended to effected by the lip running from the lower part of the outer box, is that thereby by altering the form and dimensions of the outer box a larger boiler may be inserted extending beyond the centre of the lip. The improvement of this box and lip may be used in other rotary stoves as well as in one of the form above described. The improvement of which I claim the invention and for which I ask letters patent of the United States consists in the outer box used with or without the lip as before described. In witness whereof I have hereunto set my hand 20th day of May A.D. 1836

Witnesses
Saml. H. Kellogg
Francis Rayer

Chester Grainger

R. H. B.
[illegible] 22. 1837

(1308 words)

Patented July 2: 1836.

Drawing